United States Patent [19]
Becker et al.

[11] Patent Number: 5,571,060
[45] Date of Patent: Nov. 5, 1996

[54] PROCESS FOR CORRECTING THE SHIFTING QUALITY OF AN AUTOMATIC TRANSMISSION

[75] Inventors: Gernot Becker, Dexheim; Hans Kleila, Russelsheim; Rainer Reitenbach, Bischofsheim, all of Germany

[73] Assignee: Adam Opel AG, Russelsheim, Germany

[21] Appl. No.: 335,808

[22] PCT Filed: Oct. 7, 1992

[86] PCT No.: PCT/DE92/00847

§ 371 Date: Nov. 14, 1994

§ 102(e) Date: Nov. 14, 1994

[87] PCT Pub. No.: WO93/24772

PCT Pub. Date: Dec. 9, 1993

[30] Foreign Application Priority Data

May 25, 1992 [DE] Germany .................. 42 17 270.5

[51] Int. Cl.$^6$ ................................................ F16H 61/26
[52] U.S. Cl. ................................. 477/159; 477/149
[58] Field of Search ........................... 477/159, 160, 477/149, 131

[56] References Cited

U.S. PATENT DOCUMENTS

| | | | |
|---|---|---|---|
| 4,742,461 | 5/1988 | Eschrich et al. | 364/424.1 |
| 4,970,916 | 11/1990 | Narita | 74/866 |
| 5,086,670 | 2/1992 | Nitz et al. | 74/866 |
| 5,111,718 | 5/1992 | Iizuka | 74/866 |

*Primary Examiner*—Carl D. Friedman
*Assistant Examiner*—Creighton Smith
*Attorney, Agent, or Firm*—Howard N. Conkey

[57] ABSTRACT

The invention relates to a process for the adaptive correction of the shifting quality of an automatic transmission which is coupled to an engine and in which correcting elements acting on the pressure or oil throughput bring friction elements into engagement in the form of clutches or brake bands to carry out shifting processes, the line pressure impinged on by the correcting elements being registered by means of an electronic device and corrected as a function of various operating parameters. In this case for each specific gear change besides the resultant translation ratio (R) as a function of the time from the initiation of the shifting process until its completion, also the first derivative (dR/dt) is formed and in the electronic device (1) values of the translation ratio (R) are assigned to the corresponding values of the first derivative (dR/dt) in the form of a characteristic line, said measured characteristic line being compared with reference characteristic lines present in the device (1) including a tolerance range and that in the case of inequality a correction factor (KF) is determined which upon the next identical gear change leads to an incremental increase or a decremental decrease in a correction value ($K_x$) by the correction factor (KF) and thus causes a correction of the line pressure or the oil flow by means of the pressure or oil flow-impacting correcting elements (8, 9) modulated by the electronic device (1) corresponding to the correction value ($K_x$).

4 Claims, 8 Drawing Sheets

PROCESS FOR CORRECTING THE SHIFTING QUALITY OF AN AUTOMATIC TRANSMISSION

The invention relates to a process for correcting the shifting quality of an automatic transmission which is coupled to an engine and in which the friction elements are brought into engagement via correcting elements acting on the pressure or oil throughput to carry out shifting processes where the line pressure acted on by the correcting element is registered and corrected as a function of various operating parameters.

The term "shifting quality" refers to the shifting behavior of the clutches or idlers of an automatic transmission from one gear to the next. In such cases it may occur that the clutches transmit the shifting process too "hard" or too "soft" since it is known that the rotation speeds of the driven and driving shafts must be equalized.

These shifting quality differences may stem from deviations of the transmission components in the series such as, for example electromagnetic correcting elements or solenoid valves (MV), springs, diameter on the valves, friction coefficients at the plates (clutch capacity), different motor torque Therefore a correction is necessary to capture these deviations.

From German OS 41 20 761 a line pressure control for an automatic transmission is known in which a deterioration in shifting properties caused by friction elements, wear, or by a change in hydraulic fluid temperature is prevented by comparing the shifting time duration with a preassigned optimal time duration. If a deviation is registered the line pressure is raised or lowered accordingly. In the case when additional devices are used such as compressors for air conditioners, the actually registered shifting parameters are falsified which can lead to the slipping of the friction elements on the one hand or to jerky shifting of the transmission on the other.

The comparison of the present shifting time duration with a preassigned optimal time duration does not cover all of the dynamic processes which may occur during a shifting process.

EP-A-0 176 750 describes a process for the electronic control of an automatic vehicle transmission in which electrohydraulically activated friction elements cause the shifting processes. The shifting takes place through an adaptive control using hydraulic pressure as a control magnitude. The objective is to avoid shifting quality fluctuations. In the above noted procedure it is provided that nominal values are compared with real values to form correction values, and these are used for correcting the control magnitude. As control magnitudes one can also use the time duration of the shifting process. Ultimately the actually relevant magnitude, the translation ratio, is always only indirectly influenced. The shifting pressure or the shifting time permit no direct conclusions regarding the real translation ratio.

The present invention has the objective of devising a process for correcting shifting quality which refers to an optimal criterion representing the shifting quality.

This problem is solved according to the invention by forming for each specific gear change, besides the translation ratio found as a function of time from the initiation of the shifting process until its completion, also the first derivative, and in the electronic device assigning values of the translation ratio to the corresponding values of the first derivative in the form of a characteristic line, and comparing these measured characteristic lines with reference characteristic lines present in the device including a tolerance range, and in the case of inequality determining a correction factor which, upon the next identical gear change, leads to an incremental increase or decremental decrease of a correction value by the correction factor and thus a correction of the line pressure or the oil flow is performed by correcting elements acting on the pressure or oil throughput modulated by the electronic device in accordance with the correction value.

According to an especially advantageous version of the invention it is provided that the device will output a correction value which is preferably larger than 3 through a display or an acoustic warning device and by indication of an improperly occurring shifting process. It is also envisioned that the line pressure or oil throughput to be adjusted by the electronic device is computed according to a linear mathematical relationship, the correcting elements being designed in the form of solenoid valves and are modulated electrically according to the mathematical relationships with a scanning ratio proportional to these magnitudes.

Other advantageous versions of the invention may be derived from the subclaims.

Examples of embodiment of the invention are presented in the Figures, where.

Figure 1:
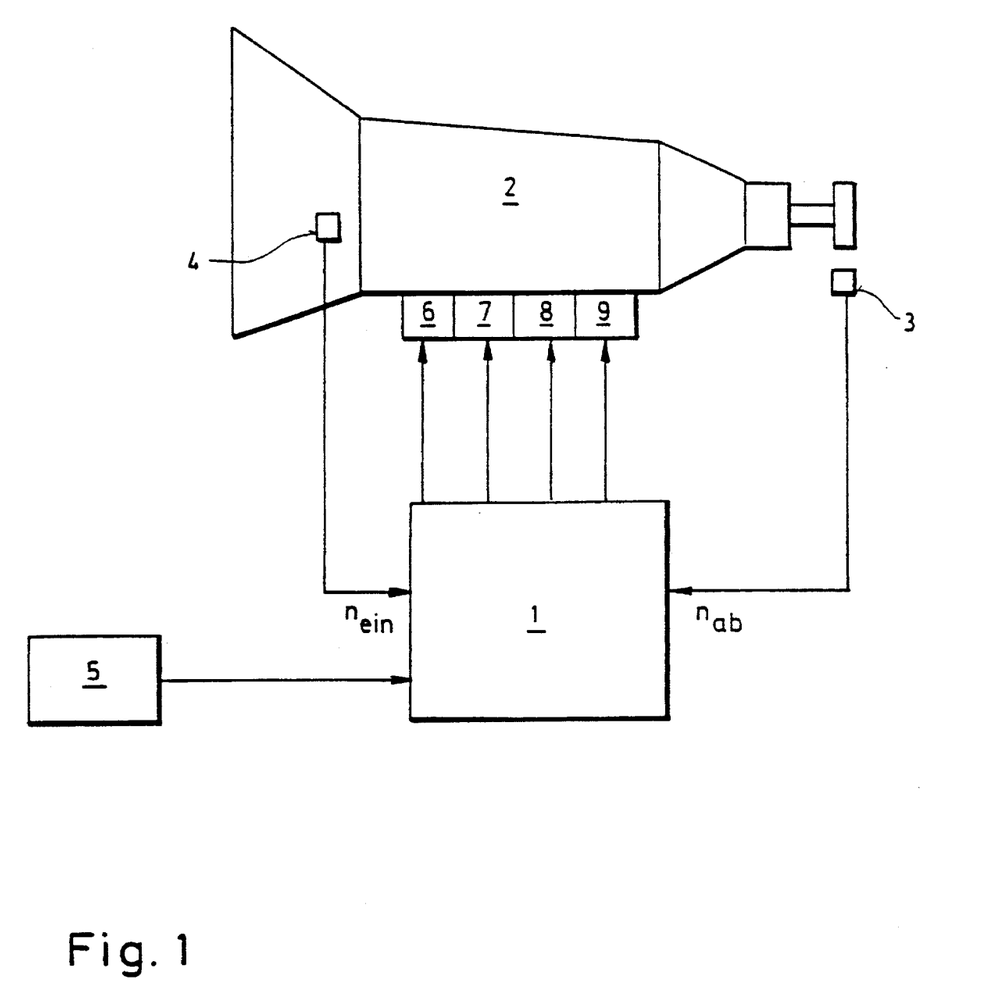
FIG. 1 is a schematic block diagram of an automatic transmission with an electronic device as a gear control.

The block diagram shown in FIG. 1 consists of the electronic device 1 which assumes the control of the automatic transmission 2 and of a microcomputer with a write/read memory, a fixed value memory, and interfaces with inputs and outputs. Via an rpm sensor for the transmission input rpm $n_{Ein}$ and via the rpm sensor 3 the transmission output rpm $n_{Ab}$ are registered as input values for the electrical device 1. Other input values fed to the device 1 include the throttle valve opening angle 5. On the output side, the electronic device 1 modulates, e.g., four solenoid valves 6, 7, 8, 9 by which the gear shifting of the automatic transmission 2 is accomplished. In this case the solenoid valves 6 and 7 may modulate four gear shifting processes in accordance with the bit combinations of a 2-digit binary number. Via the solenoid valve 8, the line pressure and via the solenoid valve 9 the oil flow of the hydraulic control system of the automatic transmission 2 is influenced in order to undertake adaptive corrections for improving the shifting quality.

Figure 2:
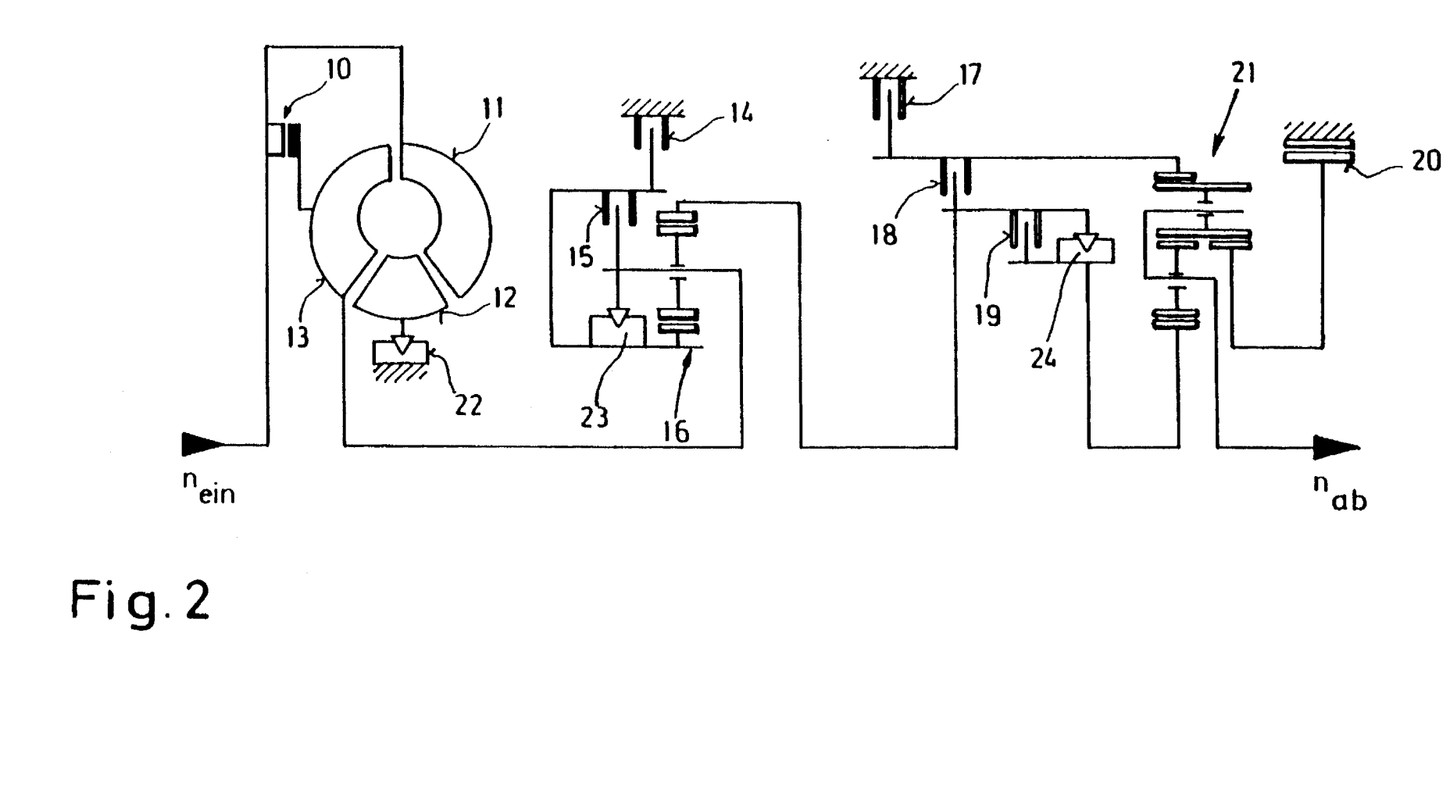
FIG. 2 is a mechanical equivalent picture of an automatic transmission.

The mechanical equivalent diagram of an automatic transmission shown in FIG. 2 consists of a torque converter with the pump 11, the turbine 13 and the guide wheel 12 which is coupled to an idler 22. The drive takes place via the pump 11 which is driven at the transmission input speed $n_{Ein}$. 10 represents a converter bridging clutch. The turbine 13 drives the cross-piece of a first planetary gear set 16 which collaborates via the friction elements 14, 15 with the idler 23 to control the planetary gear set 16. The first planetary gear set 16 is followed by a second planetary gear set 21 in the form of a Ravigneaux gear set which is controlled via the friction element 17, 18, 19, 20 and idler 24. The output rpm of the automatic transmission is $n_{Ab}$. The friction elements 14, 15, 17, 18, 19 are designed as clutches while the friction element 20 represents a brake band. The gear change is initiated by a suitable combination of engaging and disengaging friction elements 14, 15, 17, 18, 19, 20 controlled by the solenoid valves 6 and 7, during which the engagement should not be too hard but also not too soft in the sense of good shifting quality. This is achieved by adaptively varying the line pressure at which the friction elements or clutches 14, 15, 17, 18, 19 are shifted via the solenoid valve 8 with consideration of the criterion of shifting quality according to the invention. This line pressure is adapted according to the mathematical relationship $$P_{akt} = P_{Kalibr.} + \frac{K_x \cdot P_{Kalibr.}}{D_1}$$

where:

$P_{akt}$=the pressure currently applied, $P_{Kalibr.}$=base pressure for the shift in question $K_x$=correction value defined by the adaptive variation, $D_1$=variable value for sensitivity adaptation (e.g. 10), adaptively for each shifting process via the correction value $K_x$. The friction element 20 which is designed as a brake band also becomes adaptive in each shifting process where the latter is brought into engagement via the flow of oil for achieving good shifting quality by the correction value $K_x$ according to the mathematical relationship $$\dot{Q}_{akt} = \dot{Q}_{Kalibr.} + \frac{K_x \cdot \dot{Q}_{Kalibr.}}{D_2}$$

where $\dot{Q}akt$=the flow rate currently used, $\dot{Q}Kalibr.$=the base value, $K_x$=the correction value, $D_2$= variable value for sensitivity adaptation (e.g. 10), controlled by the solenoid valve 9. Before the correction value $K_x$ is determined first the correction factor KF must be determined according to the flow chart in FIG. 3. To do this, after the start in a first step a range is specified in such a way that during upshifting the throttle valve opening angle at which the upshifting occurs is measured and stored in the electronic device 1. In the case of downshifting the velocity at which downshifting occurs is stored. In a second step the translation ratio $$R = \frac{n_{Ein}}{n_{Ab}}$$

is measured as a function of the time, via the rpm sensors 3 and 4 as shown in FIG. 1, from the initiation of the gear shift until its completion. In the third step the first derivative $$R' = \frac{dR}{dt}$$

is formed. In the fourth step the question is asked of whether the shifting quality is in order. To do this the first derivative R' is formed as a function of R in the form of a characteristic line which is compared with a reference characteristic line including a tolerance range in the memory of the electronic device 1. If the measured characteristic line is within the tolerance range of the reference characteristic line, then the shifting quality is considered to be in order, and in the fifth step a correction factor KF to zero is formed. If the measured characteristic line is outside the tolerance range of the reference characteristic line, then in a second decision of a 6th step it is queried whether this shifting process was too hard or too soft. This can be registered by determining whether the measured characteristic line is above or below the reference characteristic line plus the tolerance range. If the shifting was too hard, then in a 7th step a correction factor KF to −1 is formed. If the shifting was too soft, in an eighth step the correction factor KF to +1 is formed. The further processing of the correction factor is performed with reference to the flow chart in FIG. 4. In a first step after the start the current correction factor KF for the momentary range—in the case of upshifting the throttle valve angle, in the case of downshifting the velocity—are read in. In a second step the correction value $K_x$ is formed according to the relationship $$K_x = K_{x\ vorh} + KF$$

where $K_{x\ vorh}$ corresponds to the present correction value.

Figure 4:
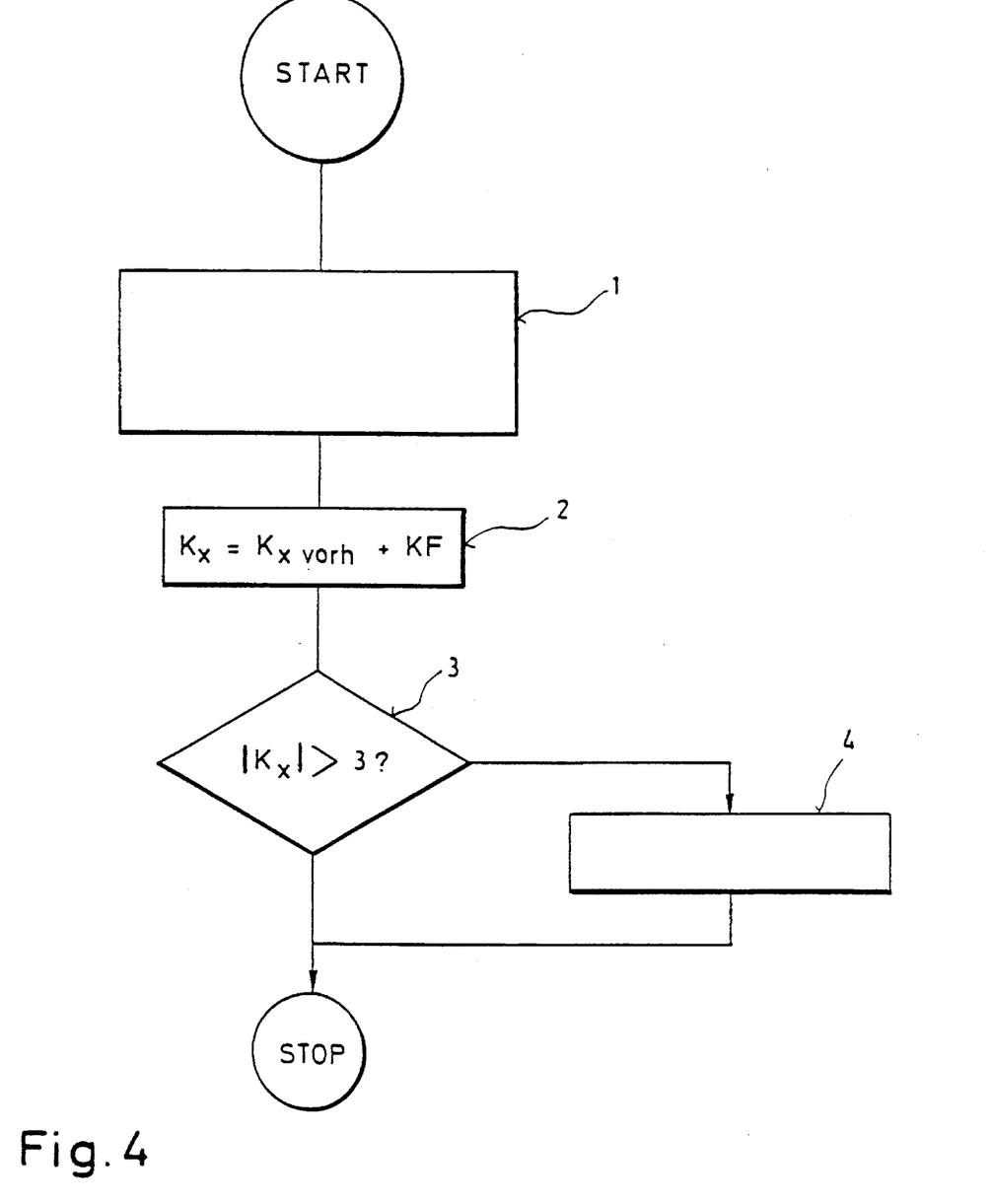
FIG. 4 is a flow chart for determining the correction value.
Figure 5:
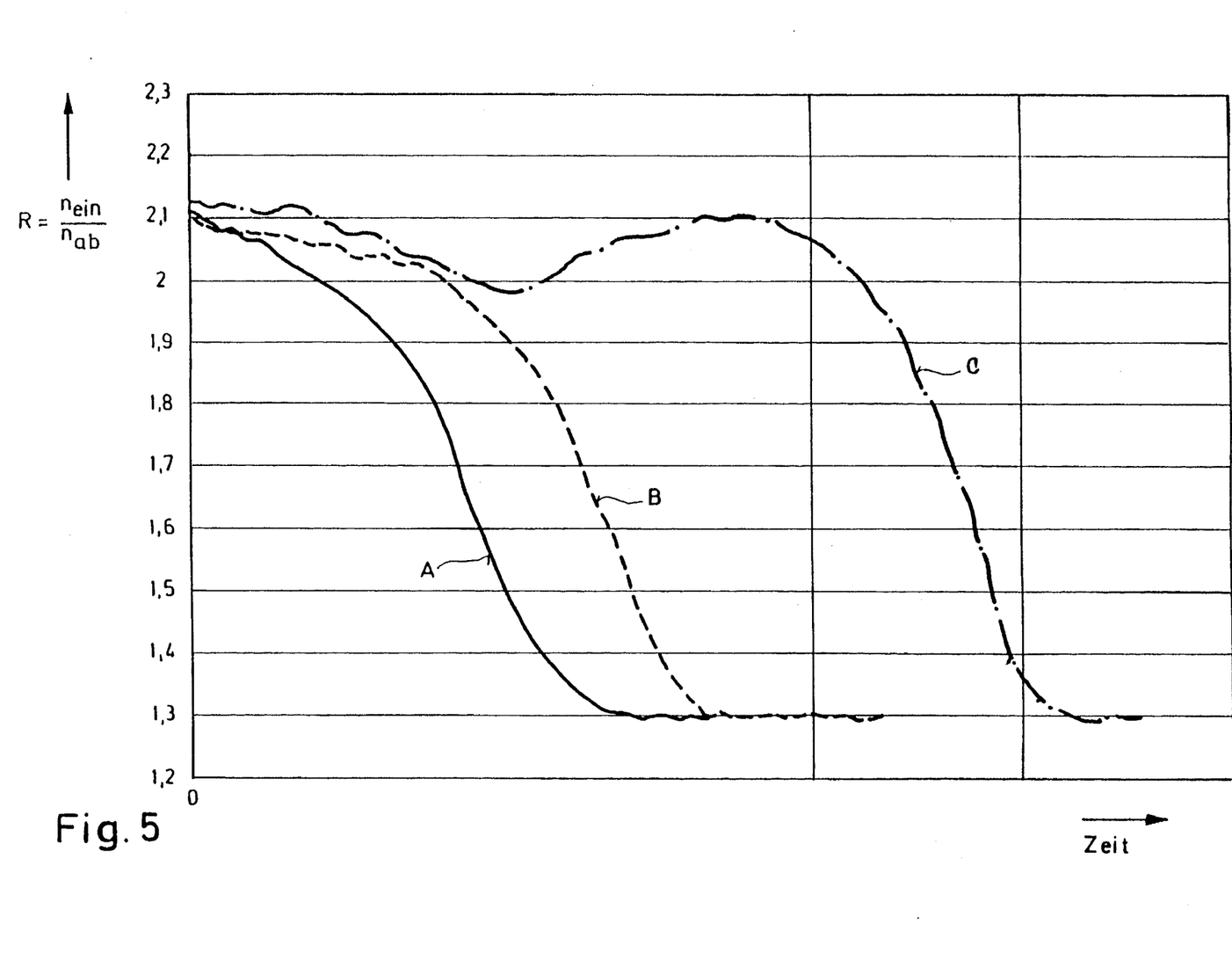
FIG. 5 is a graph of the curve of the translation ratio as a function of the shifting time for the gear change from first to second gear.
Figure 6:
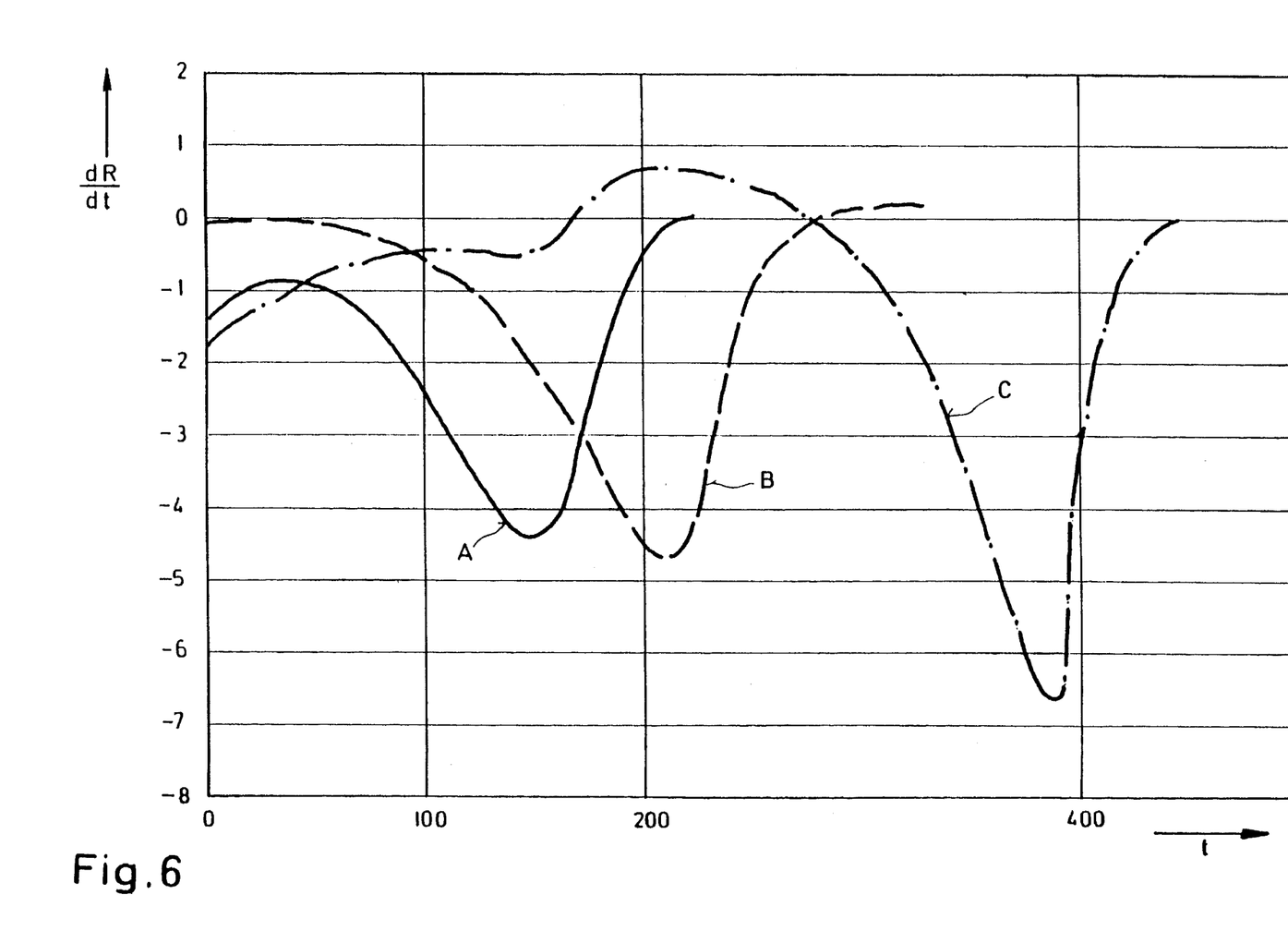
FIG. 6 is a graph of the curve of the first derivative of the translation ratio over the time for a shift from first to second gear.
Figure 7:
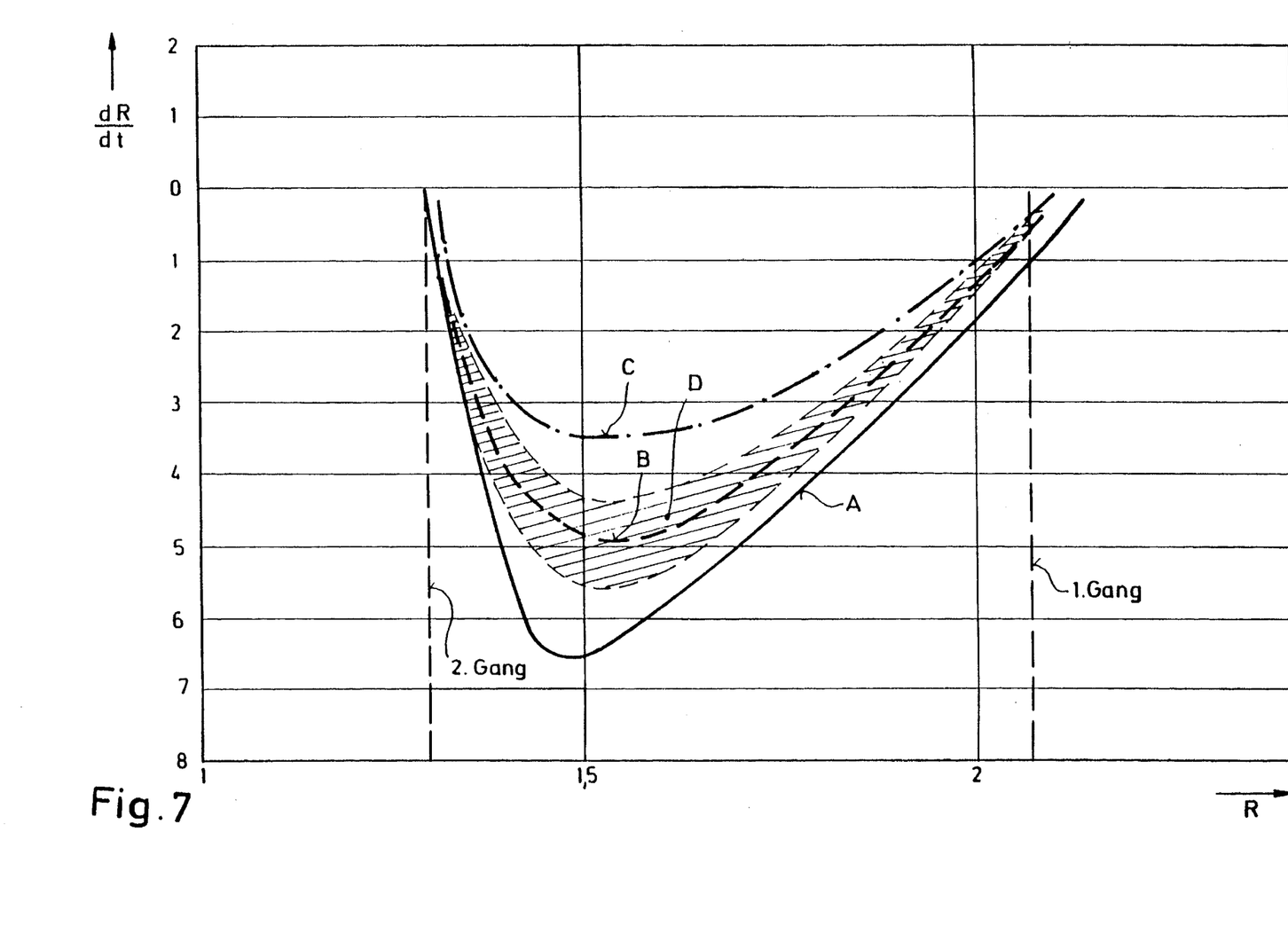
FIG. 7 is a graph of a curve of the first derivative of the translation ratio as a function of the translation ratio in the case of the gear change from first to second gear.

The latter correction value formed in the second step serves to calculate the present pressure $P_{akt}$ and the present oil flow $\dot{Q}_{akt}$ in such a way that a correction factor once determined is manifested only in a subsequent identical gear change. By specifying the range, in the case of upshifting according to the throttle valve opening angle, in the case of downshifting according to the velocity at the time of the gear change, the identity of the gear change is confirmed or verified. In a third step it is questioned whether the correction value $K_x$ adds up to more then 3. If this is the case then in a fourth step a message is output on a display or an acoustic warning device that the shifting did not take place in an orderly manner, i.e. DK=20% for shifting from 1st to 2nd together with a command to visit a service station. On the basis of the diagrams in FIGS. 5 through 8 it is shown how the criterion of shifting quality is determined by comparison of characteristic line R' as a function of R with a reference characteristic line including a tolerance range. FIG. 5 shows an upshifting process from first to second gear under full load conditions, i.e. in the case of a large throttle valve opening angle. In this case the translation ratio R is plotted as a function of the shifting time. The translation ratio in first gear at the beginning of the shifting process is about 2.1, in second gear at the end of the shifting process about 1.3. Three characteristic lines A, B, C are shown which represent different shifting qualities. Characteristic line A characterizes a shifting curve in which the shifting quality is perceived as too hard. In the case of characteristic line B the shifting quality is in order, for characteristic line C it is very soft. Disregarding the variable shapes of the curves, the shifting times, i.e. the time from the beginning of the shifting process until its completion, also deviate strongly from one another. The difference between characteristic line A and characteristic line B is not as serious as that from C. Therefore by the process according to the invention the shifting time is not referred to directly as a criterion of shifting quality but rather the entire curve. As FIG. 6 shows the first derivative of the three characteristic lines A, B, C is formed as a function of time. Finally, the diagram in FIG. 7 shows the first derivative of the translation ratio dR/dt as a function of the translation ratio R for the characteristic lines previously shown in FIGS. 5 and 6. With D a reference characteristic line is shown stored in the electronic device 1 which gives a reference characteristic line band including its tolerance range by means of which, by comparison in the electronic device 1, it can be decided whether the shifting quality is in order, too hard, or to soft. If the presently measured characteristic line, for example, lies in the tolerance range, then the shifting quality is recognized as in order. If the presently measured line is above the tolerance range, the shifting process is recognized as too soft. If the characteristic line is below the tolerance range, then the shifting process is recognized as too hard.

Figure 8:
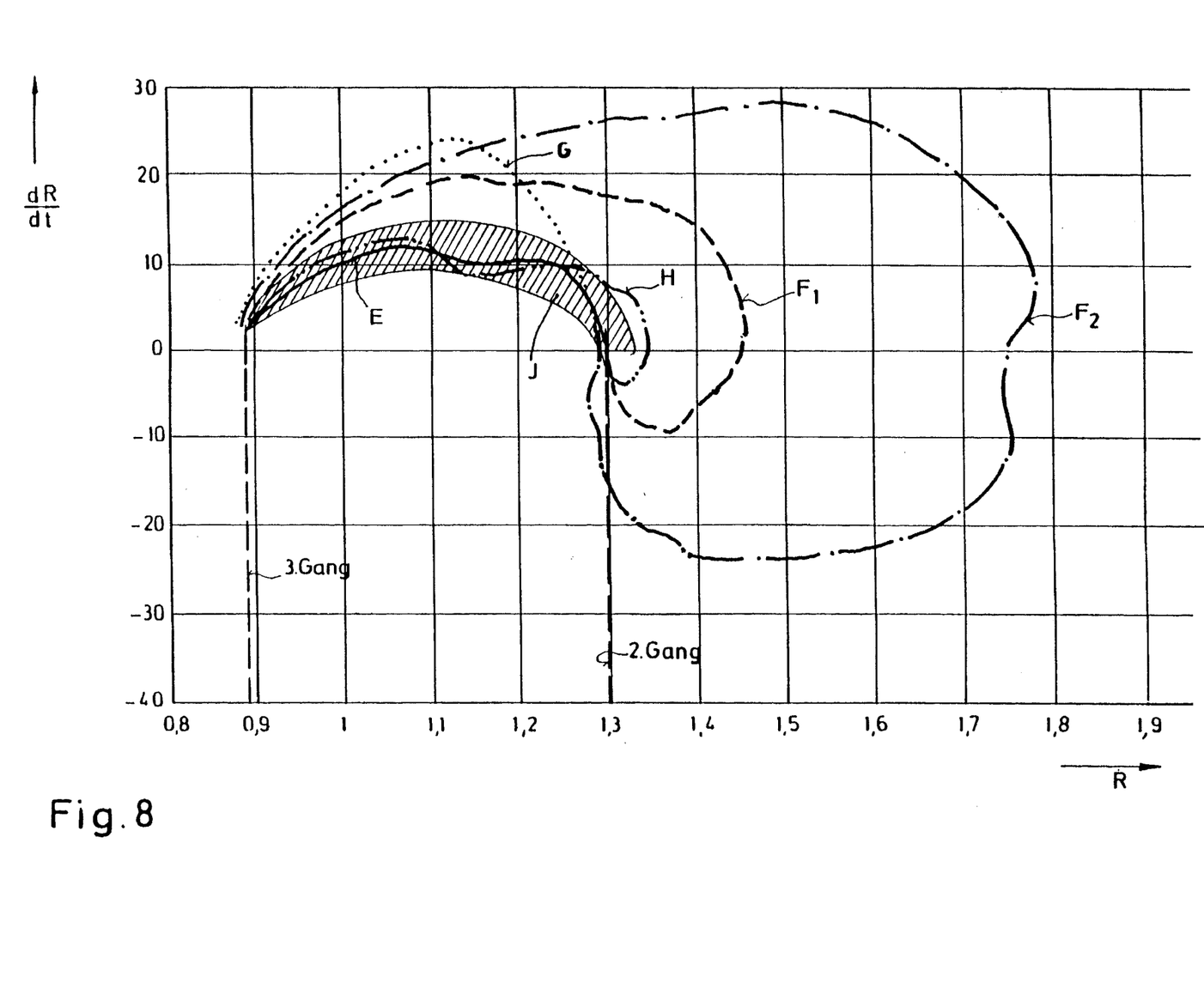
FIG. 8 is a graph of the first derivative of the translation ratio as a function of the translation ratio in the case of downshifting from third to second gear.

FIG. 8 shows a diagram for the first derivative of the translation ratio as a function of the translation ratio in the case of downshifting from third to second gear. Curve E in this case shows a downshifting process whose shifting quality was found to be in order. In the case of curve $F_1$ due to the too low line pressure, the shifting process was recognized as too soft. In the case of curve $F_2$, the line pressure was even further lowered compared to curve $F_1$ and in the case of curve G the line pressure was elevated relative to curve E. The curves E, $F_1$, $F_2$, G represent a downshifting from third to second gear at a velocity of about 50 km/h, while curve H represents a downshifting from third to second gear at a velocity of 80 km/h, at a too-low line pressure. Each curve, for example, curves $F_1$, $F_2$ and H, which extends in the graph in FIG. 8 on the right from the translation ratio of the second gear of about 1.3 indicates that the shifting process is not in order, that it is progressing too softly and that the line pressure must be increased. The tolerance band J in turn characterizes the reference characteristic line curve including the assigned tolerances. The reference characteristic lines are designed for a specific transmission and subdivided into throttle valve opening angle ranges for upshifting; for downshifting the corresponding velocities at which the downshifting occurs are read into the range recognition. The following tables give examples for upshifting and downshifting.

Table 1 is used for upshifting from first to second gear. This involves, for example, a shifting from idler to clutch. An upshifting from third to fourth gear is characterized by similar values. Table 2 is used for upshifting from second to third gear, which involves shifting from clutch to clutch. Table 3 is used for downshifting from 3rd to 2nd gear, which again involves a shifting from clutch to clutch and Table 4 is used for downshifting from fourth to third gear, which involves shifting from idler to clutch.

TABLE 2

Reference characteristic lines R' = f(R), limiting values for 2nd–3rd shifting.

| DK | 1.4 | 1.35 | 1.3 | 1.2 | 1.1 | 1.05 | 1 | 0.95 | 0.93 | R |
|---|---|---|---|---|---|---|---|---|---|---|
| 0–40% | 1 | 3 | 5 | 6 | 7 | 8 | 6 | 3 | 3 | R' |
| 41–100% | 1 | 5 | 6 | 6 | 8 | 7 | 7 | 6 | 4 | R' |
| KD | 2 | 5 | 6 | 7 | 7 | 6 | 5 | 4 | 3 | R' |

TABLE 3

Reference characteristic lines R' = f(R), limiting values for 3rd–2nd shifting

| translation | 0.93 | 0.95 | 1 | 1.05 | 1.15 | 1.25 | 1.3 | 1.35 | 1.4 | R |
|---|---|---|---|---|---|---|---|---|---|---|
| R' | 5 | 8 | 9 | 11 | 15 | 13 | 11 | 7 | 3 | R' |

TABLE 4

Reference characteristic lines R' = f(R), limiting values for 4th–3rd shifting

| translation | 0.7 | 0.72 | 0.76 | 0.79 | 0.81 | 0.85 | 0.88 | 0.9 | 0.92 | R |
|---|---|---|---|---|---|---|---|---|---|---|
| R' | 3 | 3 | 5 | 8 | 12 | 12 | 10 | 7 | 3 | R' |

As Tables 1 and 2 show, in the case of upshifting, three ranges are provided for the throttle valve opening angle, i.e. the range of 0 to 40%, 41 to 100% and KD (kick-down). Thus in the case of upshifting a reference characteristic field is present while in downshifting as Tables 3 and 4 show only a reference characteristic line comes to bear.

The adaptive correction of the shifting quality will now be illustrated with reference to an example of upshifting from first to second gear. Assume that the shift command to change gears occurs at a throttle valve opening angle of 50%. With this the reference characteristic line from Table 1 with the range of 41 to 100% of the throttle valve opening is selected. As FIG. 7 shows this reference characteristic line would correspond to the curve D including a tolerance strip. The present shifting characteristic line is now measured and tested with the reference characteristic line for the criterion of "shifting quality in order" according to the fourth program step of the flow chart in FIG. 3. If the present characteristic line, for example, has the curve of C in FIG. 7, then according to the flow chart in FIG. 3, to the question "too hard?" the answer is "No," since the curve of C is above the reference characteristic line D. With this a correction factor KF is set at +1 according to the flow chart of FIG. 3. According to the flow chart in FIG. 4, now by means of the

TABLE 1

Reference characteristic lines R' = f(R), limiting values for 1st–2nd shifting.

Figure 3:
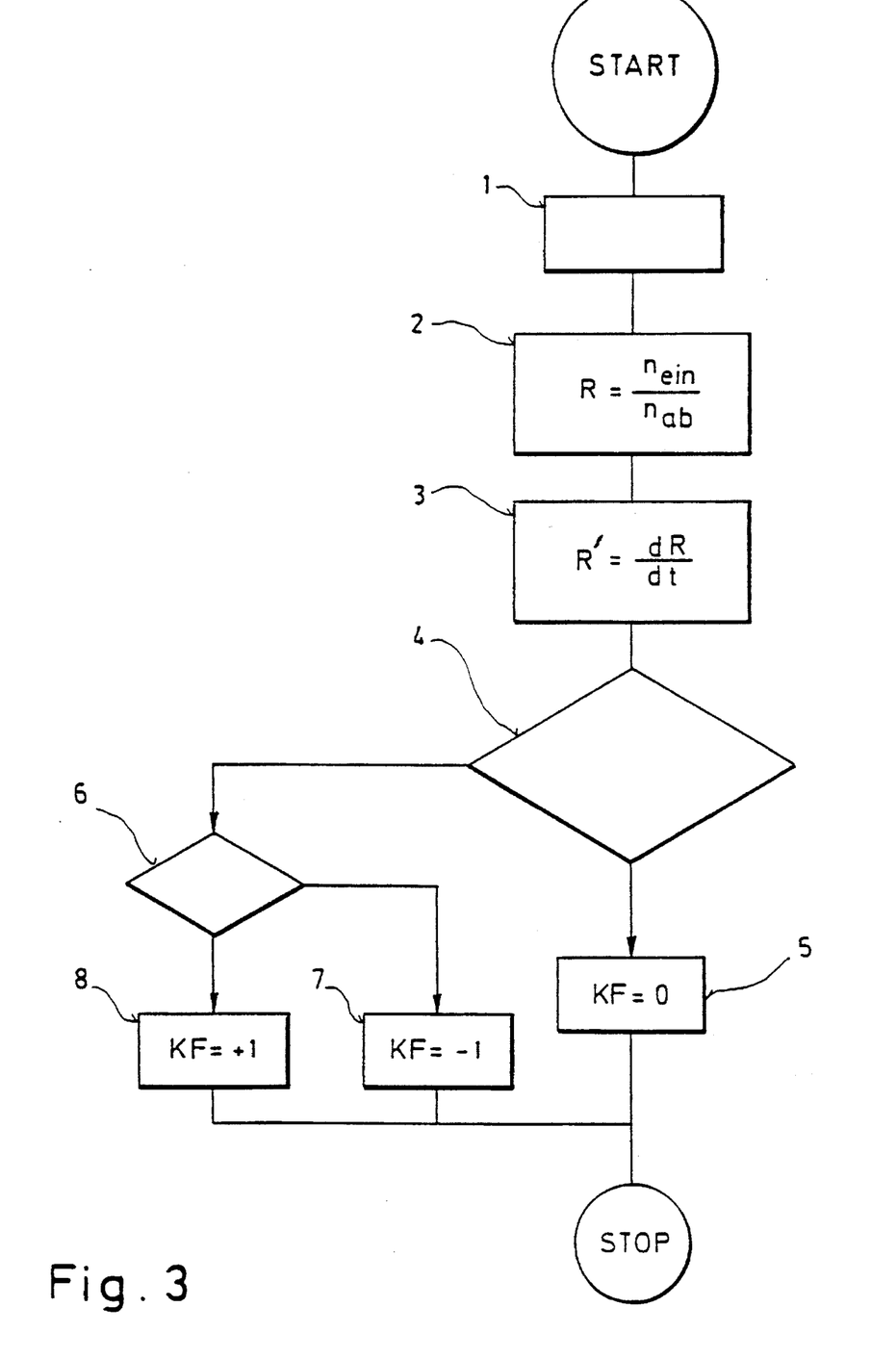
FIG. 3 is a flow chart for generation of the correction factors.

| DK | 2.46 | 2.4 | 2.3 | 2.1 | 1.9 | 1.7 | 1.6 | 1.55 | 1.5 | 1.45 | 1.42 | R |
|---|---|---|---|---|---|---|---|---|---|---|---|---|
| 0–40% | 2 | 5 | 6 | 7 | 7 | 6 | 5 | 4 | 3 | 2 | 1 | R' |
| 41–100% | 1 | 3 | 5 | 6 | 7 | 8 | 6 | 3 | 3 | 1 | 1 | R' |
| KD | 1 | 5 | 6 | 6 | 8 | 7 | 7 | 6 | 4 | 3 | 2 | R' | present correction factor KF the correction value $K_x$ is calculated by adding to the foregoing correction value $K_x$ vorh, the present correction factor KF. The newly formed correction value $K_x$, however, is manifested only in a subsequent identical shifting process, i.e. if at a later time a shift from first to second gear is to be performed at a throttle valve opening of 50%, the line pressure is formed according to the mathematical relationship $$P_{akt} = P_{Kalibr.} + \frac{K_x \cdot P_{Kalibr.}}{D_1}$$

and modulated with a keying ratio of the solenoid valve 8 corresponding to this proportional value so that now in this shifting process the line pressure is raised and with it the present characteristic line is shifted into the region of the tolerance band D. If this has not yet been accomplished satisfactorily after the first correction, a further correction will become necessary by the correction factor +1 so that an adaptive adjustment occurs. The correction value $K_x$ then has the value 2. If another adaptation should become necessary because the line pressure is still too low, in the next subsequent identical step the correction value is increased once more by +1 so that $K_x$ then has the value of +3. If another adaptive adjustment should become necessary on the basis of the comparison of the characteristic line curves, the correction value $K_x$ would amount to more than 3, which would have the result that according to the third step of the flow chart in FIG. 4 a display or an acoustic warning device will issue a notice that the shifting process is no longer in order at a throttle valve opening angle of 50% when upshifting from first to second gear and a service station should be visited. For the case when the line pressure was too high at the time of the shifting process from first to second gear, e.g. at a throttle opening of 80%, to the question "shifting quality in order" according to the flow chart in FIG. 3 in the subsequent question "too hard?" and the answer "yes" the correction factor of −1 is formed, and subsequently according to the flow chart in FIG. 4 the correction value $K_x$ is formed from $K_{x\,vorh}$+KF with KF=−1 which ultimately leads to an adaptive lowering of the line pressure. If at this time also the line pressure is still too high, in the subsequent or next following identical shifting process, the line pressure would be further reduced once more by reducing the correction value $K_x$ by the correction factor 1, by which via the previously mentioned mathematical relationship the line pressure is reduced once more. If $K_x$ at the beginning of the shifting process at a throttle valve opening of 80% according to the last mentioned example was equal to 0 and the line pressure too great, then $K_x$ after adaptive adjustment twice is now equal to −2. If a further adaptive adjustment becomes necessary for the purpose of a reduction in the line pressure and $K_x$ has a sum greater than three, then also as a diagnostic output on the display the message is presented: "Shifting process not in order at throttle valve opening angle=80% and 1–2 shifting; visit service station." Upon the applying of the brake band of the element 20 in FIG. 2 the oil flow $Q_{akt}$ is adjusted adaptively also via the correction value $K_x$. Therefore upon each gear change in the case of upshifting a query of the throttle valve opening angle 5 take place in the electronic device 1 which is stored there, and the correction values $K_x$ determined for this specific shifting process are assigned to the throttle valve opening angle in the form of a correction table which is constantly updated, whereupon the updated correction value $K_x$ acts only in the immediately following gear change. The identity of the gear change is obtained in this case from the nature of the shifting, e.g. from 1st to 2nd and the position of the throttle valve opening angle, e.g. 50%. For each downshifting, the vehicle velocity is queried and stored in the device 1, and the correction values $K_x$ determined in this specific shifting process are assigned to the vehicle velocity, also in the form of a correction table which is constantly updated, in which case the updated correction value $K_x$ is manifested only in the immediately following identical gear change. Tables 5 and 6 show examples of correction values $K_x$ for an upshifting, e.g. from first to second gear at different throttle opening angles and Table 6 shows correction values $K_x$ for downshifting, e.g. from third to second gear at different speeds.

TABLE 5

(Correction table)
Upshifting 1st–2nd

| DK) | 10 | 20 | 30 | 40 | 50 | 60 | 70 | 80 | 90 | 100 | KD |
|---|---|---|---|---|---|---|---|---|---|---|---|
| Correction value, $K_x$ | 0 | 0 | 1 | 0 | 3 | 0 | 0 | 0 | 0 | −1 | 1 |

TABLE 6

(Correction table)
Downshifting 3–2

| v [km/h] | 30 | 45 | 60 | 75 | 90 | 110 | 130 |
|---|---|---|---|---|---|---|---|
| Correction value, $K_x$ | 0 | 2 | 1 | 0 | −1 | −2 | 0 |

If, for example, an upshifting is made according to Table 5 from first to second gear at a throttle valve opening angle of 50%, then the line pressure is charged with the correction value $K_x$=3. If, for example, a downshifting according to Table 6 from third to second gear take place at a speed of 90 km/h, then the line pressure is charged with the correction value $K_x$=−1 according to the previously mentioned mathematical relationships.

We claim:

1. A method of controlling an automatic transmission which is coupled to an engine, the transmission including friction elements that are engaged by oil at a line pressure to effect a shift between a pair of transmission gears, the method comprising the steps of:

storing a line pressure value;

initiating the shift between the pair of transmission gears;

controlling the line pressure, when the shift is initiated, at the stored line pressure value to engage the friction elements;

measuring a transmission input speed $n_{ein}$;

measuring a transmission output speed $n_{ab}$;

determining a translation ratio R having a value $n_{ein}/n_{ab}$;

determining a derivative dR/dt of the translation ratio R;

determining a difference between the determined derivative corresponding to the determined translation ratio and a reference derivative corresponding to the determined translation ratio and determining a line pressure correction factor $K_x$ that is a function of the determined difference; and adjusting the stored line pressure value by the correction factor so that a subsequent shift between the pair of transmission gears is effected by the adjusted stored controlled line pressure to reduce the difference between the determined and reference derivatives of the translation ratio.

2. A method for controlling an automatic transmission which is coupled to an engine, the transmission including friction elements that are engaged by oil at a line pressure to effect a shift between a pair of transmission gears, the method comprising the steps of:

storing line pressure values, each corresponding to a respective range of values of an engine parameter;

measuring the value of the engine parameter;

initiating the shift between the pair of transmission gears;

controlling the line pressure, when the shift is initiated, at the stored line pressure value corresponding to the range of values of the engine parameter that includes the measured value to engage the friction elements;

measuring a transmission input speed $n_{ein}$;

measuring a transmission output speed $n_{ab}$;

determining a translation ratio R having a value $n_{ein}/n_{ab}$;

determining a derivative dR/dt of the translation ratio R;

determining a difference between the determined derivative corresponding to the determined translation ratio and a reference derivative corresponding to the determined translation ratio and determining a line pressure correction factor $K_x$ that is a function of the determined difference; and adjusting the stored line pressure value that corresponds to the range of values of the engine parameter that includes the measured value of the engine parameter by the correction factor so that a subsequent shift between the pair of transmission gears effected by the adjusted stored line pressure effects a reduction in the difference between the determined and reference derivatives of the translation ratios.

3. The method of claim 2 wherein the engine includes a throttle valve and the engine parameter is throttle valve position and wherein the method further includes the step of measuring the throttle valve position.

4. A method of controlling an automatic transmission which is coupled to an engine, the transmission including friction elements that are engaged by oil at a controlled line pressure to effect a shift between a pair of transmission gears, the method comprising the steps of:

storing a line pressure value;

initiating the shift between the pair of transmission gears;

controlling the line pressure, when the shift is initiated, at the stored line pressure value to engage the friction elements;

storing a reference schedule of a first derivative of a translation ratio R as a function of the translation ratio R, wherein R is equal to $n_{ein}/n_{ab}$, $n_{ein}$ is an input speed of the transmission, and $n_{ab}$ is an output speed of the transmission;

measuring the transmission input speed $n_{ein}$;

measuring the transmission output speed $n_{ab}$;

determining the translation ratio R having the value $n_{ein}/n_{ab}$;

determining the first derivative of the translation ratio R;

forming, from the determined translation ratio and the determined first derivative, a characteristic schedule of the determined first derivative as a function of the determined translation ratio during the shift between the pair of transmission gears;

comparing the characteristic schedule with the reference schedule and determining a line pressure correction factor $K_x$ when the characteristic schedule varies from the reference schedule; and adjusting the stored line pressure value by the correction factor so that a subsequent shift between the pair of transmission gears is effected by the adjusted stored line pressure to reduce the difference between the characteristic schedule and the reference schedule.

* * * * *